United States Patent
Panga et al.

(10) Patent No.: US 7,956,016 B2
(45) Date of Patent: Jun. 7, 2011

(54) METHODS TO CONTROL FLUID LOSS IN A WELL BORE

(75) Inventors: Mohan K. R. Panga, Stafford, TX (US); Isabelle Couillet, Kuala Lumpur (MY); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 52 days.

(21) Appl. No.: 12/550,999

(22) Filed: Aug. 31, 2009

(65) Prior Publication Data

US 2011/0053807 A1 Mar. 3, 2011

(51) Int. Cl.
*C09K 8/68* (2006.01)
*C09K 8/60* (2006.01)
*C09K 8/588* (2006.01)
*E21B 43/16* (2006.01)

(52) U.S. Cl. ........ 507/209; 507/203; 507/217; 507/219; 507/221; 166/305.1

(58) Field of Classification Search .................. 507/203, 507/209, 217, 219, 221; 166/305.1
See application file for complete search history.

(56) References Cited

U.S. PATENT DOCUMENTS

| | | |
|---|---|---|
| 4,432,881 A | 2/1984 | Evani |
| 4,440,228 A | 4/1984 | Swanson |
| 4,951,921 A | 8/1990 | Stahl et al. |
| 5,096,603 A | 3/1992 | Peiffer et al. |
| 6,581,701 B2 | 6/2003 | Heying |
| 6,878,754 B2 | 4/2005 | L'Alloret |
| 7,056,868 B2 * | 6/2006 | Benton et al. .................. 507/226 |
| 7,081,439 B2 | 7/2006 | Sullivan et al. |
| 7,160,931 B2 | 1/2007 | Cheng et al. |
| 7,193,007 B2 | 3/2007 | Cheng et al. |
| 7,385,019 B2 | 6/2008 | Maroy et al. |
| 7,427,583 B2 | 9/2008 | Couillet et al. |
| 2005/0199396 A1 * | 9/2005 | Sierra et al. .................. 166/276 |
| 2007/0272409 A1 * | 11/2007 | Growcock ................. 166/278 |
| 2007/0281869 A1 | 12/2007 | Drochon et al. |
| 2008/0280788 A1 | 11/2008 | Parris et al. |
| 2008/0280790 A1 | 11/2008 | Mirakyan et al. |

FOREIGN PATENT DOCUMENTS

| | | |
|---|---|---|
| EP | 0583814 | 2/1994 |
| EP | 1591619 | 11/2005 |
| WO | 9526455 | 10/1995 |

\* cited by examiner

*Primary Examiner* — Timothy J. Kugel
*Assistant Examiner* — Atnaf Admasu
(74) *Attorney, Agent, or Firm* — Martin Rzaniak; David Cate; Robin Nava

(57) ABSTRACT

The invention discloses a method of controlling fluid loss from a subterranean formation of a well bore. In a first aspect, the method is done by providing a treatment fluid made of an aqueous fluid and a hydrophobic polymer; and introducing the treatment fluid into the wellbore. In a second aspect, the method is done by providing a treatment fluid made of water and a water soluble polymer; providing in the treatment fluid a fluid loss additive having a hydrophobic polymer; using the treatment fluid in a well bore of a subterranean formation; allowing the treatment fluid to establish a permeable filter cake with the water soluble polymer in at least a portion of the well bore; and allowing hydrophobic polymer to enter into the filter cake to reduce permeability of the filter cake.

7 Claims, 6 Drawing Sheets

US 7,956,016 B2

METHODS TO CONTROL FLUID LOSS IN A WELL BORE

FIELD OF THE INVENTION

The invention relates to methods for controlling fluid loss in a well bore from a subterranean formation. More particularly, the invention relates to methods for controlling fluid loss using hydrophobic polymers.

BACKGROUND

The statements in this section merely provide background information related to the present disclosure and may not constitute prior art.

Hydrocarbons (oil, condensate, and gas) are typically produced from wells that are drilled into the formations containing them. The oil or gas residing in a subterranean formation can be recovered by drilling a well into the formation. A wellbore is typically drilled down to the subterranean formation while circulating a drilling fluid through the wellbore. After the drilling is terminated, a string of pipe, e.g., casing, is run into the wellbore. Then, the subterranean formation is usually isolated from other formations using a technique known as well cementing. In particular, Also, for a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

The drilling fluid, cementing fluid or stimulation fluid generally includes a fluid loss control additive to reduce the loss of fluid, e.g., water, from the fluid when in contact with permeable subterranean formations and zones. Fluid loss control plays an important role in those oilfield treatment fluids (fracturing, cementing, gravel/frac packing etc). Most of the treatments use a polymer based fluid (guar, guar derivative or hydroxy ethyl cellulose, etc.) to control leak off. These fluids build a low permeability filter cake that reduces the leak-off rate by reducing the diffusion rate of the solvent across the boundary between the bulk of the fluid and the formation (filter cake). For further decrease in leak-off rate macroscopic solids such as fine silica, calcium carbonate, mica, or clays are added to the fluid. Also, the addition of a second soluble polymer such as polyacrylamide, starch, xanthan, etc to the polymer based fluid is not uncommon to control fluid leak-off. One of the problems associated with the use of additives (solids/polymer) to control leak-off is their cleanup after the treatment is done. Inadequate cleanup can result in a decrease in oil/gas productivity. In addition, the use of second polymer gives rise to mixing issues at the surface and higher friction pressures due to increase in polymer loading Consequently, there is a need for a fluid loss control additive that is more efficient. A method to control fluid leak-off is disclosed herewith using a hydrophobic polymer as a fluid loss additive for polymer based fluids. In addition to fluid loss control, the method also decreases the risk associated with cleanup and mixing on surface of the well bore.

SUMMARY

In a first aspect, a method of controlling fluid loss from a subterranean formation of a well bore is disclosed: providing a treatment fluid made of an aqueous fluid and a hydrophobic polymer; and introducing the treatment fluid into the wellbore.

In certain embodiments, the treatment fluid further may have a water soluble polymer.

In a second aspect, the method provides a treatment fluid comprising water and a water soluble polymer; provides in the treatment fluid a fluid loss additive made of a hydrophobic polymer; uses the treatment fluid in a well bore of a subterranean formation; allows the treatment fluid to establish a permeable filter cake with the water soluble polymer in at least a portion of the well bore; and allows hydrophobic polymer to enter into the filter cake to reduce permeability of the filter cake.

In certain embodiments, the hydrophobic polymer is a water soluble hydrophobically modified polymer. The water soluble hydrophobically modified polymer may be a thermoassociative polymer, wherein above a low critical solution temperature the thermoassociative polymer has hydrophobic properties. The low critical solution temperature may be temperature from the subterranean formation. The low critical solution temperature may be above 50° C. or 60° C.

In a third aspect, the method provides a treatment fluid comprising water and a water soluble polymer at a first temperature; provides in the treatment fluid a thermoassociative polymer, wherein above a low critical solution temperature the thermoassociative polymer has an hydrophobic polymer and wherein the low critical solution temperature is above the first temperature and equal or below a second temperature of a zone of interest of a subterranean formation in a well bore; uses the treatment fluid in the well bore; allows the treatment fluid to establish a permeable filter cake with the water soluble polymer in the zone of interest; and allows the hydrophobic polymer from the thermoassociative polymer to enter into the filter cake to reduce permeability of the filter cake. The first temperature may be ambient temperature at surface of the well bore. The second temperature may be above 50° C. or 60° C.

In certain embodiments, the water soluble polymer is substituted galactomannan, guar gum, hydroxypropyl guar, carboxymethylhydroxypropyl guar, carboxymethyl guar, or guar-containing compound. The treatment fluid may be a drilling fluid, a cementing fluid, a fracturing fluid, or a gravel packing fluid.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The method to control fluid loss may be used in conjunction with a variety of subterranean treatments, including, but not limited to, drilling operations, cementing operations, fracturing treatments, and completion operations (e.g., gravel packing). In some embodiments, the method will apply to a portion of a subterranean formation. In certain embodiments, a composition may be introduced into a well bore that penetrates the subterranean formation. Optionally, the composition further may comprise particulates and other additives suitable for better fluid loss control of the subterranean formation.

In a first aspect, the method of controlling fluid loss from the subterranean formation of the well bore comprises providing a treatment fluid and introducing the treatment fluid into the wellbore. The treatment fluid is an aqueous fluid with a hydrophobic polymer, capable of forming microscopic phases separate from the bulk fluid.

Figure 1:
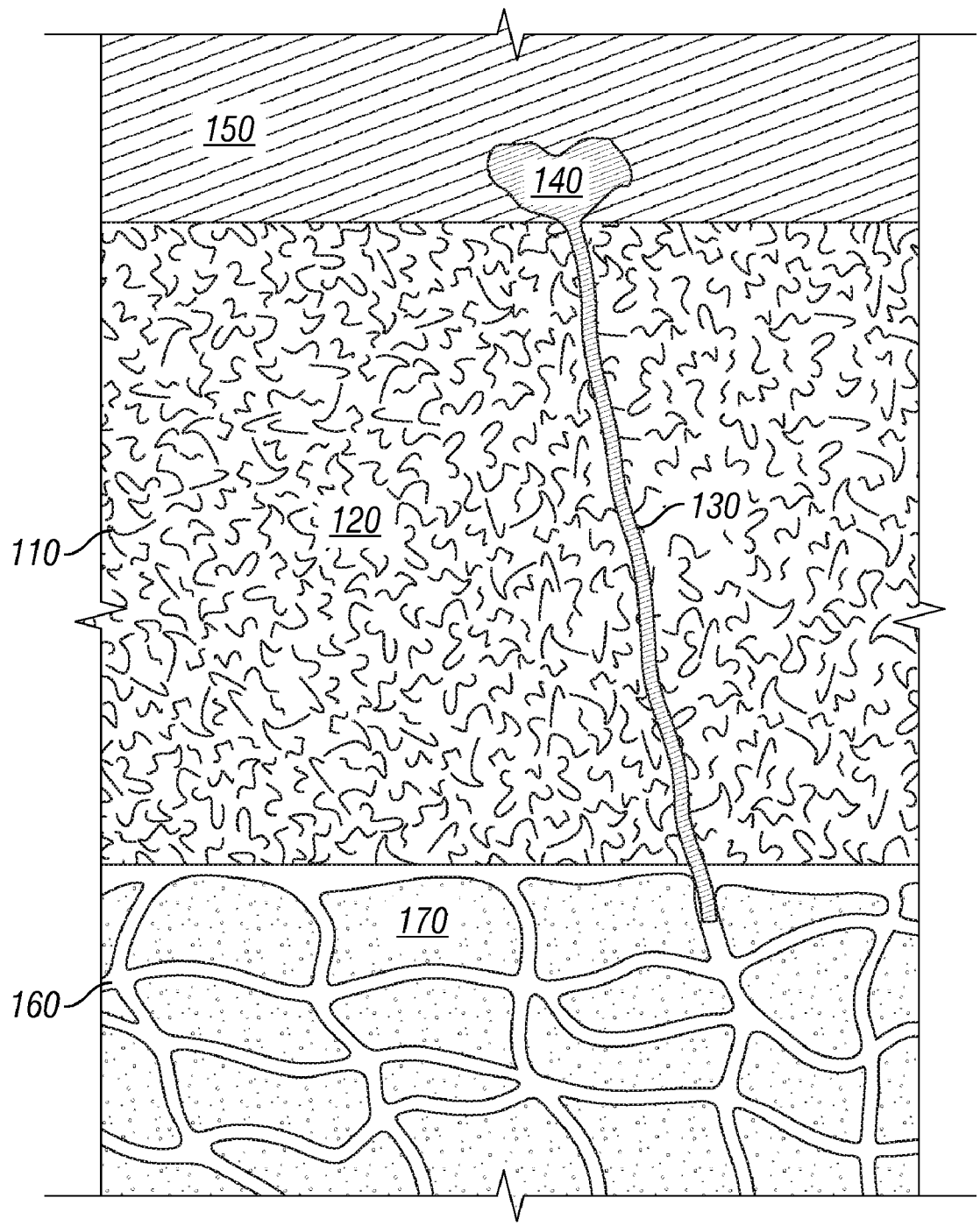
FIG. 1 shows a mechanism of fluid loss control according to prior art solution.
Figure 2:
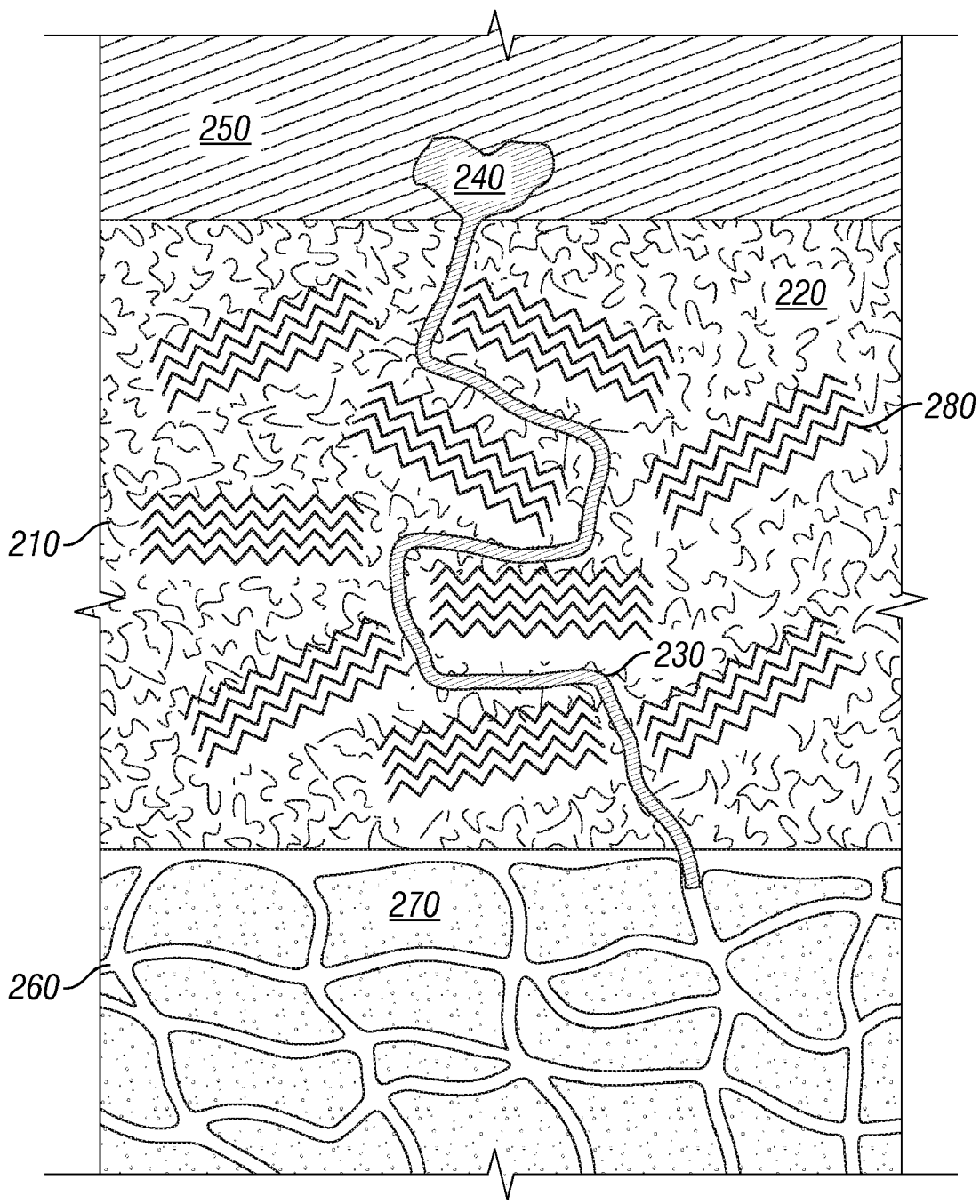
FIG. 2 shows a mechanism of fluid loss control according to methods disclosed herewith.

Without trying to be bound by a theory, it is believed that creating a tortuous path for the fluid across the filter cake is an effective method of reducing the fluid loss by increasing the total distance that an element of fluid needs to travel from the bulk of the fluid into the formation, for a given pressure differential. FIG. 1 depicts the mechanism of fluid loss according to prior art solution. An element of fluid 140 from the bulk fluid 150 is dragged into the filter cake 120 by the pressure difference. In the presence of the polymer entanglements 110, the element of fluid is required to follow a straight path 130 to reach the pore space 160 in the formation 170. In comparison, FIG. 1 depicts the mechanism of fluid loss according to methods disclosed herewith. An element of fluid 240 from the bulk fluid 250 is dragged into the filter cake 220 by the pressure difference. In the presence of the hydrophobic polymer, capable of creating separate phases 210 of very reduced permeability to the liquid, the element of fluid is required to follow a tortuous path 230 across the entangled polymer chains 280 to reach the pore space 260 in the formation 270.

In general any water dispersible hydrophobic polymer capable of forming microstructures with reduced permeability to water molecules of sufficiently big size can be effective for the application. In particular polymers forming crystalline phases such as cellulose, polymannose, and the like can be useful for the application.

Examples of hydrophobic polymers that can be used include thermo-associative polymers having a hydrophilic backbone with randomly attached hydrophilic chains that become hydrophobic when the temperature reaches the Low Critical Solution Temperature (LCST). Above the LCST, thermo-associative polymers possess the same properties than water-soluble hydrophobically modified polymers. Water-soluble hydrophobically modified polymers are water-soluble polymers containing a small number of strongly hydrophobic substituents. They are commonly used as thickening and rheology-control agents in aqueous systems. The specific rheological behaviour of such polymeric systems arises from their ability to give rise to weak intra- and intermolecular interactions between the hydrophobic groups distributed along the polymer chains.

The heat-sensitive chains can be fixed on-grafting or incorporated in-(copolymerisation) the macromolecular structure considered. The different techniques of synthesizing these polymers are disclosed in the European patent number 0,583, 814, herewith incorporated by reference. The first approach consists of grafting, by known techniques, heat-sensitive side chains onto a polymer skeleton, itself hydrosoluble. It is necessary in this case to provide the side chain with an active site capable of cooperating for the grafting with a corresponding active site on the polymer skeleton. The second approach consists of copolymerising by known techniques hydrosoluble monomers, prepolymers or macromonomers or forming hydrosoluble sequences with monomers, prepolymers or macromonomers which are hydrosoluble or capable of forming hydrosoluble sequences and, either having the LCST property in the useful temperature range, or carrying a side chain having this property.

The water soluble backbone can be a synthetic polymer such as polyacrylic acid, polyacrylamide, copolymers of acrylic acid and acrylamide but also a natural polymer such as polysaccharide. Suitable polysaccharides are starch or starch derivatives such as starch phosphate, starch succinate, aminoalkyl starch or hydroxypropyl starch; cellulose or cellulose derivatives as carboxymethyl cellulose, methyl cellulose, ethyl cellulose or hydroxypropylmethyl cellulose; chitin or chitin derivatives such as the chitosan or chitosan derivatives such as the N-carboxybutyl chitosan or the N-carboxymethyl chitosan; galactomannans, in particular, guar and guar derivatives as the carboxymethyl guar or the carboxymethyl hydroxypropyl guar derivatives. It can also be a synthetic polymer such as a polyanhydride, for example the poly (isobutylene-alt-maleic anhydride), the poly(ethylene-alt-maleic anhydride), the poly(ethylene-graft-maleic anhydride), a polyacrylamide, a polyacrylate, a polyacrylate/polyacrylamide copolymer, a polyether, a polyester, a polyamide or a polyvinylalcohol. As a general rule, every type of water-soluble polymer can be proposed as soon as it is sufficiently hydrophilic to prevent the macroscopic phase separation of the system above the grafts LCST.

A wide variety of polymers can be used for the LCST grafts as soon as they present a lower critical point in water such as polyethylene oxide (PEO), polypropylene oxide (PPO), polyvinylmethylether (PVME), poly N-isopropylacrylamide (PNIPAM), cellulosic derivatives . . . . Polyether chains (PEO, PPO, copolymer of PEO and PPO) are especially appreciate since the PEO/PPO copolymers are low cost products that present a phase separation in the required temperature range (from 60° C. up to 200° C.) depending on their molecular weight. The side chains just mentioned must carrying an active terminal group for grafting, notably an amine, acid, alcohol function to form an amide, ester, acid bound with the active groups of the polymer backbone.

The thermo-associative polymer is soluble in water at temperature below the LCST. The LCST value depends on the nature and molecular weight of the grafted chain. The viscosifiying properties of the polymer depend on the nature, molecular weight and concentration of the side chains.

The side chain has an average molecular weight comprises between 100 and 100,000 g/mol. The polymer backbone has an average molecular weight comprised between 10,000 and 10,000,000 g/mol and, preferably, between approximately 100,000 and approximately 2,000,000 g/mol. Above 2,000,000 and, definitely, above 10,000,000 g/mol, the polymer may form structures which are difficult to remove from the fracture during the subsequent backflow of formation fluids. Under 100,000 and, definitely, under 10,000 g/mol, the polymer concentration that would be necessary to obtain a treatment fluid is likely to be too high hence increasing considerably the fluid associated costs.

The thermo-associative polymer has a principal backbone and, grafted on said principal backbone, randomly or not, at a substitution degree range comprised between 0.01 and 20 pendant hydrophobic chains per polymer chain. A minimum value is requested to observe viscosifying effect whereas one can define a maximum grafting ratio above which the system would precipitate. In fact, the substitution degree of the thermo-associative polymer is adjusted with a view to obtain a satisfactory fluid viscosity with a sufficient polymer water solubility.

The polymer can be charged or non-charged, the charges being positive or negative and being located on the polymer backbone or on the pendant hydrophobic chains.

In a second aspect, the method of controlling fluid loss from the subterranean formation of the well bore comprises providing a treatment fluid and introducing the treatment fluid into the wellbore. The treatment fluid is an aqueous fluid made with a hydrophobic polymer as disclosed above and with a guar, a crosslinked polymer or any water soluble polymer.

The water soluble polymer can be a crosslinked polymer. The crosslinked polymer can generally be any crosslinked polymers. It can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of water soluble polymer include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof. Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently, unless they can be used at lower concentrations.

In other embodiments, the water soluble polymer is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. These embodiments are described in U.S. Patent Publications US2008-0280790 and US2008-0280788 respectively, each of which are incorporated herein by reference.

Linear (not cross-linked) polymer systems may be used also as water soluble polymer. However, in some cases, may not achieve the full benefits because they may require more concentration for same viscosity, and may require a breaker. Any suitable crosslinked polymer system may be used, including for example, those which are delayed, optimized for high temperature, optimized for use with sea water, buffered at various pH's, and optimized for low temperature. Any crosslinker may be used, for example boron, titanium, zirconium, aluminum and the like. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives may be used or included provided that they are tested for compatibility with the fluid. For example, some of the standard crosslinkers or polymers as concentrates usually contain materials such as isopropanol, n-propanol, 2 butoxyethanol, methanol, non BTX oils, aliphatic oils, or diesel oil.

The water soluble polymer gelling agent can be a replaced partially or totally by a surfactant. The surfactant may be a viscoelastic surfactant (VES) fluid system. VES fluid system is a fluid viscosified with a viscoelastic surfactant and any additional materials, such as but not limited to salts, co-surfactants, rheology enhancers, stabilizers and shear recovery enhancers that improve or modify the performance of the viscoelastic surfactant.

The VES include cationic, anionic, nonionic, mixed, zwitterionic and amphoteric surfactants, especially betaine zwitterionic viscoelastic surfactant fluid systems or amidoamine oxide viscoelastic surfactant fluid systems. Examples of suitable VES systems include those described in U.S. Pat. Nos. 5,551,516; 5,964,295; 5,979,555; 5,979,557; 6,140,277; 6,258,859 and 6,509,301, which are all hereby incorporated by reference. The system is also useful when used with several types of zwitterionic surfactants. In general, suitable zwitterionic surfactants have the formula:

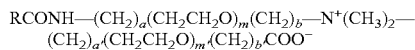

in which R is an alkyl group that contains from about 14 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and the O in either or both $CH_2CH_2O$ groups or chains, if present, may be located on the end towards or away from the quaternary nitrogen. Preferred surfactants are betaines.

In a third aspect, the method of controlling fluid loss from the subterranean formation of the well bore comprises providing a treatment fluid comprising water and a water soluble polymer as disclosed above; providing in the treatment fluid a fluid loss additive comprising a hydrophobic polymer as disclosed above; allowing the treatment fluid to establish a permeable filter cake with the water soluble polymer in at least a portion of the well bore; and allowing hydrophobic polymer to enter into the filter cake to reduce permeability of the filter cake.

The polymer filter cake permeability is reduced by using a polymeric fluid loss additive having enough hydrophobicity such that it will prefer to occupy the void spaces in the filter cake due to unfavorable interaction with the water soluble polymer network and water. In addition, the hydrophobic polymer chains can further self assemble in the filter cake depending on the concentration of hydrophobic monomers to decrease the permeability of the filter cake.

This method controls leak-off better than present conventional leak-off control additive used for fracturing. Further, if low molecular weight hydrophobic polymers are used, they offer two advantages: the viscosity of the fluid is not altered and therefore the friction pressure is not increased, the clean-up of the polymer after the treatment is much better as the polymer will flow back without the need for additional breakers.

To facilitate a better understanding of the invention, the following examples of embodiments are given. In no way should the following examples be read to limit, or define, the scope of the invention.

EXAMPLES

Figure 3:
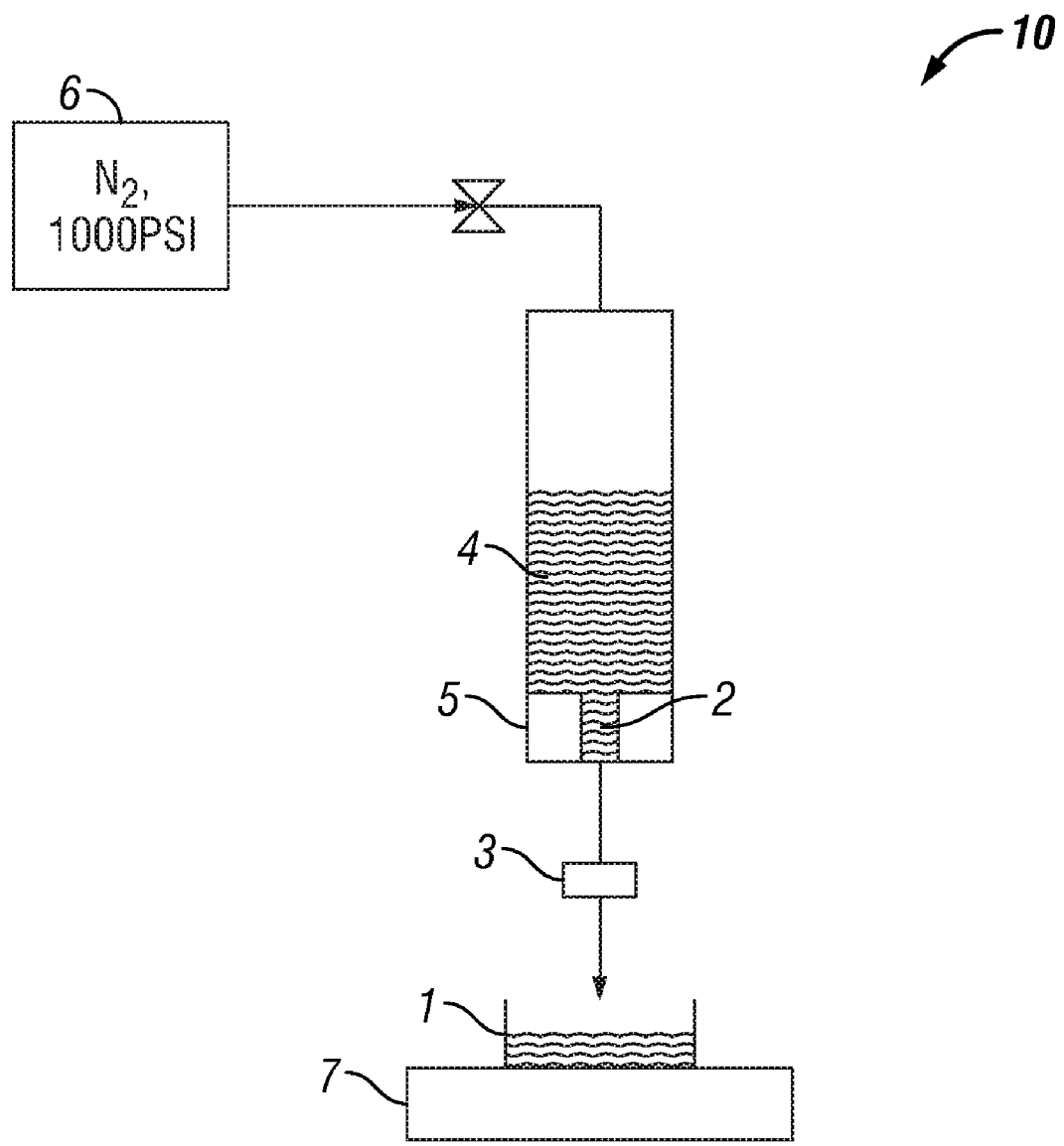
FIG. 3 shows a schematic diagram of a fluid loss cell used for measuring fluid leak-off.

A series of experiments were conducted to demonstrate method to control fluid loss. Fluid leak-off is typically measured using a fluid loss cell 10. A schematic of the fluid loss cell is shown in FIG. 3. A brine (2 wt % KCl) saturated core 2 (1 in. length×1 in. diameter) is held in place at the bottom of the cell 10 by a mechanical assembly and a confining sleeve 5. On the top of the core, 80 ml of polymer fluid 4 was added. A 1000 psi differential pressure 6 was applied to the fluid in the cell using a $N_2$ line and the leak-off of filtrate 1 was measured using a balance 7. To prevent boiling at high temperatures, a backpressure regulator 3 was connected to the system between the balance 7 and the bottom of the core 2. All the static fluid loss experiments were conducted at a temperature of 150° F. (65.50° C.) and a differential pressure of 1000 psi.

Three different types of hydrophobic polymers were used along with guar based fracturing fluid. A dry high yielding guar supplied from Hercules/Aqualon or Rhodia was used to prepare the guar fluid. The commercially available hydrophobic polymers used in this study are: Pluronic P84, sourced from BASF; Pluronic F68, sourced from BASF; EGB230-55, sourced from Expert gel. The properties of these polymers are shown in Table 1 below:

TABLE 1

| Polymer | Mol. Wt g/mol | % PEO | 1% aq. Cloud Pt. (° C.) |
|---|---|---|---|
| P84 | 4200 | 40 | 74 |
| F68 | 8400 | 80 | >100 |
| EGB230-55 | 40000 | — | — |

The Pluronics P84 and F68 from BASF are tri-block copolymers of polyethylene oxide (PEO) and polypropylene oxide (PPO). Their polymer structure could be written as PEO-PPO-PEO where the PPO is bounded by PEO groups on both sides. PEO chains are hydrophilic at room temperature and exhibit hydrophobicity as the temperature is increased. PPO chains are hydrophobic at room and high temperatures. The polymer EGB230-55 is a block copolymer of polyethylene oxide (PEO) and polypropylene oxide (PPO) linked by urethane, urea and allophanate bonding units (PEO-PPO-PEO-Link-PEO-PPO-PEO-Link-). It should also be noted that F68 is more hydrophilic than P84 as it contains higher weight fraction of PEO.

Figure 4:
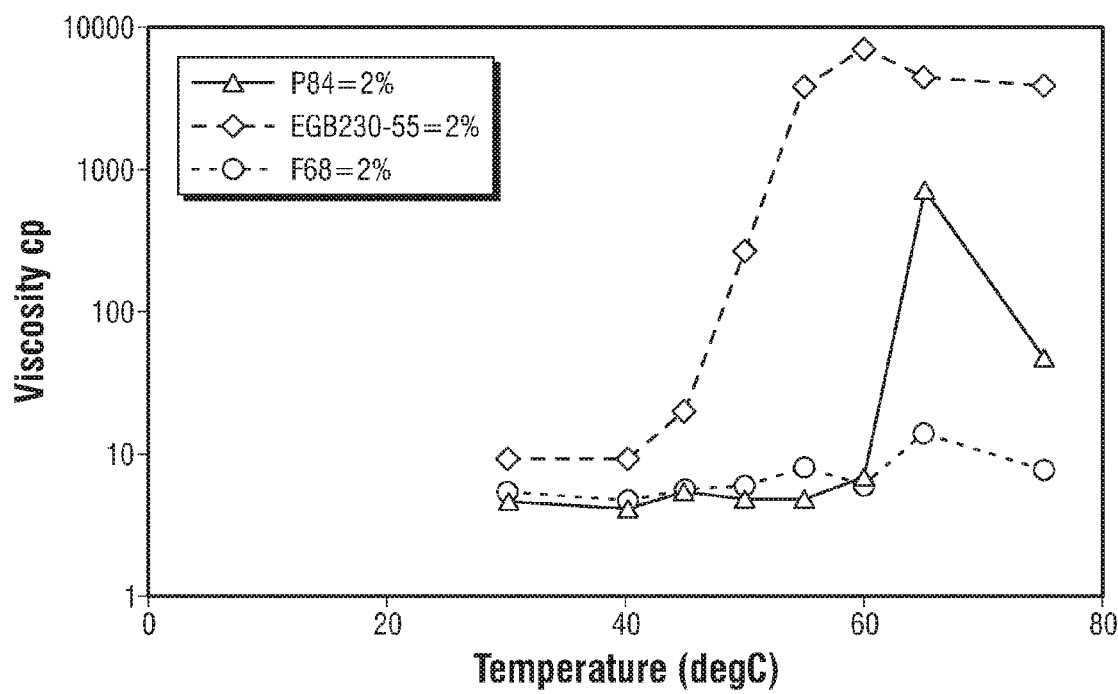
FIG. 4 shows viscosity profile of hydrophobic polymers as a function of temperature.

Thermosensitive polymers (TSP) are hydrophilic at room temperature. To demonstrate fluid loss control of hydrophobic polymers with guar, it is necessary to determine the temperature at which the TSP's become hydrophobic. FIG. 4 shows the viscosity of polymers P84, F68 and EGB230-55 as a function of temperature. It can be seen that the viscosity increase of each of the polymers is different at the same concentration. EGB230-55 shows higher viscosity as it is more hydrophobic and has higher molecular weight than P84 and F68.

The polymer P84 shows higher viscosity than F68 despite of lower molecular weight because F68 is more hydrophilic than P84 as mentioned earlier and it does not undergo as much self-assembly as P84. The turbidity of 2 wt % solutions of F68, P84 and EGB230-55 at 65° C. was analyzed and it can be shown that there is more turbidity with increasing order of hydrophobicity. It should be noted that all the polymers show increase in viscosity when the temperature is increased to 65° C. indicating that the hydrophilic segments exhibit hydrophobic nature at this temperature.

Figure 5:
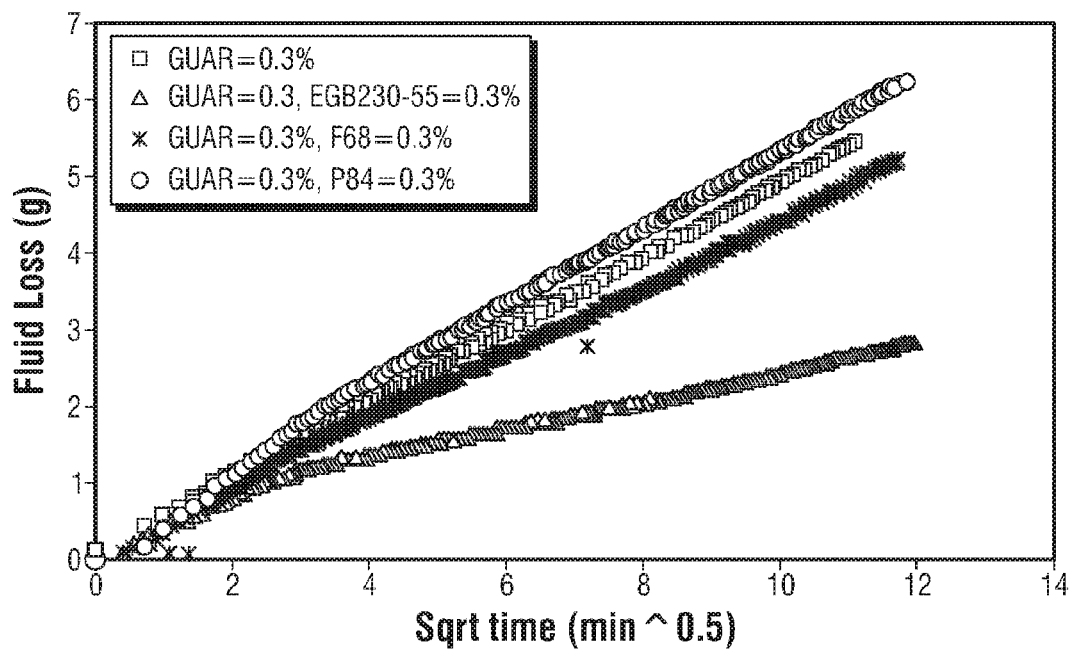
FIG. 5 shows fluid leak-of curves of guar with various hydrophobic polymers at 24° C. (75° F.).

To study the effect of hydrophobic polymer on leak-off, the hydrophobic polymer was added to the guar fluid as a fluid loss additive. The concentration of guar in solution was maintained constant at 0.3 wt %. The experiments were conducted at two different temperatures to check the effect of hydrophobicity on reduction in fluid loss. FIG. 5 shows the effect of adding 0.3 wt % of P84 or F68 or EGB230-55 to 0.3 wt % of guar solution. It can be seen that P84 and F68 do not reduce the leak-off of 0.3 wt % guar solution. The leak-off is significantly reduced by EGB230-55.

Figure 6:
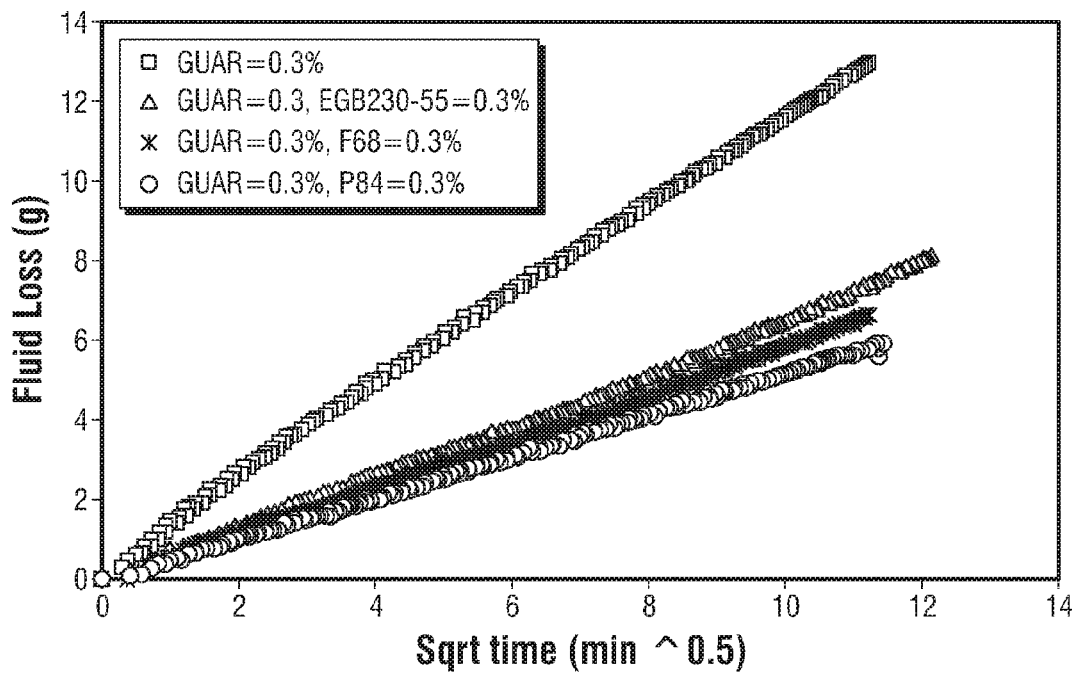
FIG. 6 shows fluid leak-off curves of guar with various hydrophobic polymers at 65.5° C. (150° F.).

FIG. 6 shows the leak-off curves of the same fluids at 65.5° C. and it can be seen that P84 and F68 reduce the leak-off significantly at this temperature. The reduction in leak-off with increase in temperature is due to increased hydrophobicity of the polymers P84 and F68. However, the polymer EGB230-55 showed good leak-off control even at low temperatures. While the reason for this behavior is not clear at this point, it is speculated that the molecule has enough hydrophobicity already at room temperature due to the large number of hydrophobic PPO segments in the molecule.

Figure 7:
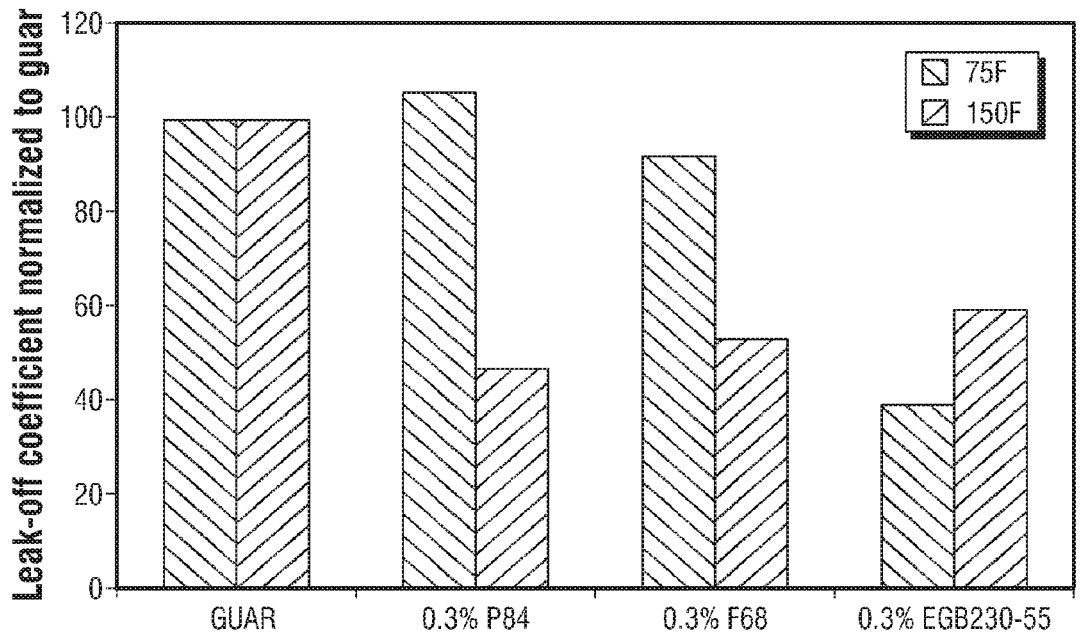
FIG. 7 shows wall building coefficients of various hydrophobic polymers normalized to $C_w$ of 0.3 wt % guar.

FIG. 7 shows the leak-off coefficients of the fluids tested previously (0.3 wt % of guar solution, 0.3 wt % of P84 or F68 or EGB230-55 in 0.3 wt % of guar solution) normalized to the leak-off coefficient of 0.3% guar. It can be seen from FIG. 7 that the polymer P84 shows better reduction in fluid loss than F68 and EGB230-55. The leak-off coefficient is 54% less than the leak-off coefficient of guar. This is a significant reduction in leak-off coefficient. The behavior of polymers P84 and F68 at room and high temperatures show that the addition of hydrophobic polymers can reduce fluid leak-off during a fracturing treatment.

Figure 8:
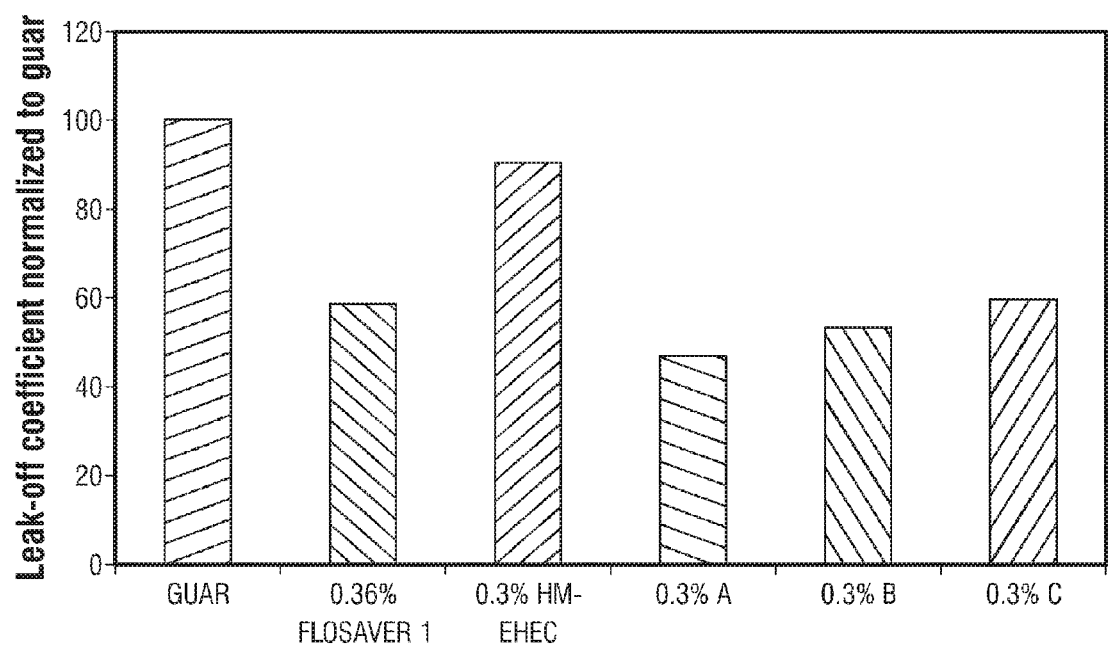
FIG. 8 shows normalized wall building coefficients of various hydrophobic polymers.

Comparison of Wall Building Coefficients ($C_w$) was studied in the foregoing. The wall building coefficients of different fluid loss additives explored in this study are compared to the fluid loss additive commercially available from Schlumberger under the trade name FloSAVER 1. FIG. 8 shows the normalized leak-off coefficients of different fluid loss additives tested.

It can be seen from FIG. 8 that P84 and F68 at 0.3 wt % perform better performances than FloSAVER at 0.36 wt %. FloSAVER 1 is a mixture of starch and mica particles and when added to the fracturing fluid, it increases the fluid viscosity significantly, resulting in increase in friction pressure. In addition, it also needs a breaker to break the starch component at the end of the job. It is also known that the mica and starch damage the proppant pack conductivity. On the other hand, P84 and F68 are low viscosity fluids at surface and they do not require a breaker as their molecular weight is far lower than starch. It is expected that P84 and F68 will clean up without the addition of a breaker. The above comparisons show that P84 is a better and more efficient fluid loss additive than FloSAVER 1.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method comprising:
   a. providing a treatment fluid comprising water and a water soluble polymer at a first temperature;
   b. providing in the treatment fluid a thermoassociative polymer, wherein above a low critical solution temperature the thermoassociative polymer has an hydrophobic polymer and wherein the low critical solution temperature is above the first temperature and equal or below a second temperature of a zone of interest of a subterranean formation in a well bore;
   c. using the treatment fluid in the well bore;
   d. allowing the treatment fluid to establish a permeable filter cake with the water soluble polymer in the zone of interest; and
   e. allowing the hydrophobic polymer from the thermoassociative polymer to enter into the filter cake to reduce permeability of the filter cake.

2. The method of claim 1, wherein the water soluble polymer is substituted galactomannan, guar gum, hydroxypropyl guar, carboxymethylhydroxypropyl guar, carboxymethyl guar, or guar-containing compound.

3. The method of claim 1, wherein the first temperature is ambient temperature at surface of the well bore.

4. The method of claim 1, wherein the second temperature is above 50° C.

5. The method of claim 4, wherein the second temperature is above 60° C.

6. The method of claim 1, wherein the low critical solution temperature is temperature from the subterranean formation.

7. The method of claim 1, wherein the treatment fluid is a drilling fluid, a cementing fluid, a fracturing fluid, or a gravel packing fluid.

* * * * *